Nov. 23, 1943.  H. C. BOSTWICK  2,335,169
TIRE MAKING DRUM
Filed April 19, 1941  3 Sheets-Sheet 1

INVENTOR.
BY Henry C. Bostwick
Attorney

Nov. 23, 1943.   H. C. BOSTWICK   2,335,169
TIRE MAKING DRUM
Filed April 19, 1941   3 Sheets-Sheet 2

INVENTOR.
Henry C. Bostwick
BY Dalts Dean & McBean
Attorneys

Nov. 23, 1943.     H. C. BOSTWICK     2,335,169
TIRE MAKING DRUM
Filed April 19, 1941          3 Sheets-Sheet 3

INVENTOR.
Henry C. Bostwick,
BY Dales, Tear, McTrean
Attorneys.

Patented Nov. 23, 1943

2,335,169

UNITED STATES PATENT OFFICE 2,335,169

TIRE-MAKING DRUM

Henry C. Bostwick, Akron, Ohio, assignor to The Akron Standard Mold Company, Akron, Ohio, a corporation of Ohio Application April 19, 1941, Serial No. 389,291

22 Claims. (Cl. 154—9)

This invention relates to a drum adapted for use in manufacturing tires; more particularly, comparatively small tires as, for instance, those used on the tail wheels of airplanes, or for making tires having comparatively small diameters of the beads. In providing a drum for this purpose the problem is to so devise the drum so that it may be readily collapsed to render the tire removable without distortion. To this end, I have provided a drum formed with a substantially flat periphery and with recessed ends to accommodate the beads of the tire being formed, such drum being made up of separate inter-fitting sections, each individually removable through the circular space within the bead of the tire.

More particularly, my invention provides a suitable tubular support or sleeve adapted for mounting on a driven spindle and carrying coacting sections forming the periphery and adjacent ends of the drum. These end sections and other parts may be removed from the sleeve with the tire which has been formed, and then the sections may be removed one after the other from the interior of such formed tire.

Another feature of the invention comprises two sets of sections, one for each end and part of the periphery of the drum, these sections being supported in longitudinal alignment, and preferably adjustable axially to give the proper size drum, the space between the sections proper being bridged by suitable gap-closing device.

The invention is hereinafter more fully described and the essential features are summarized in the claims.

Figure 1:
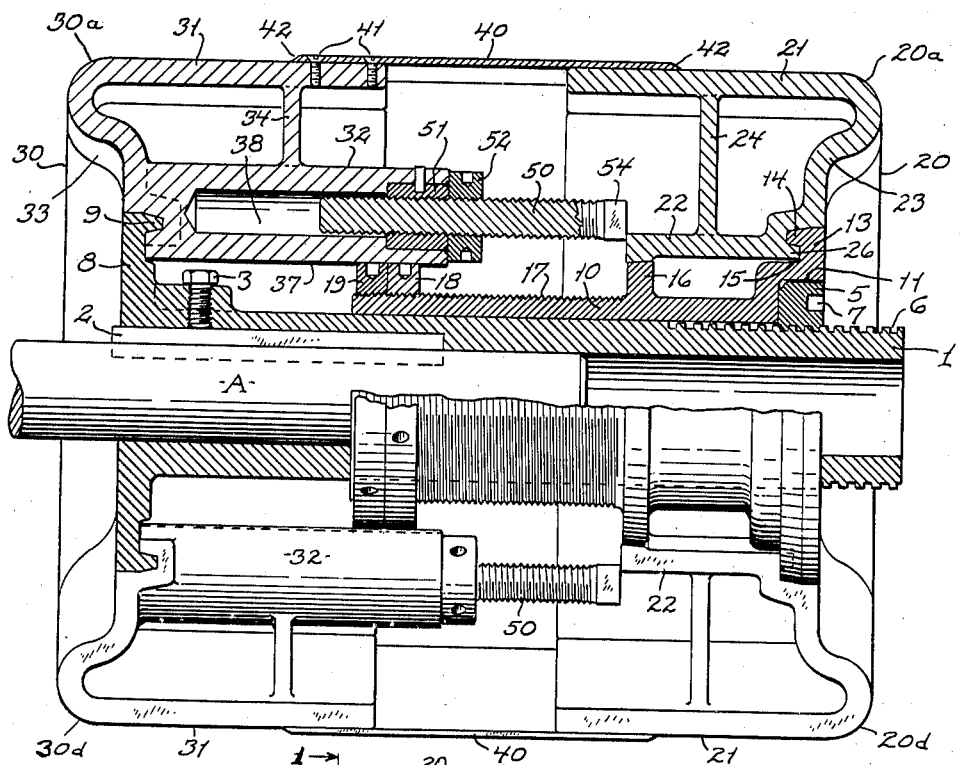
Figure 2:
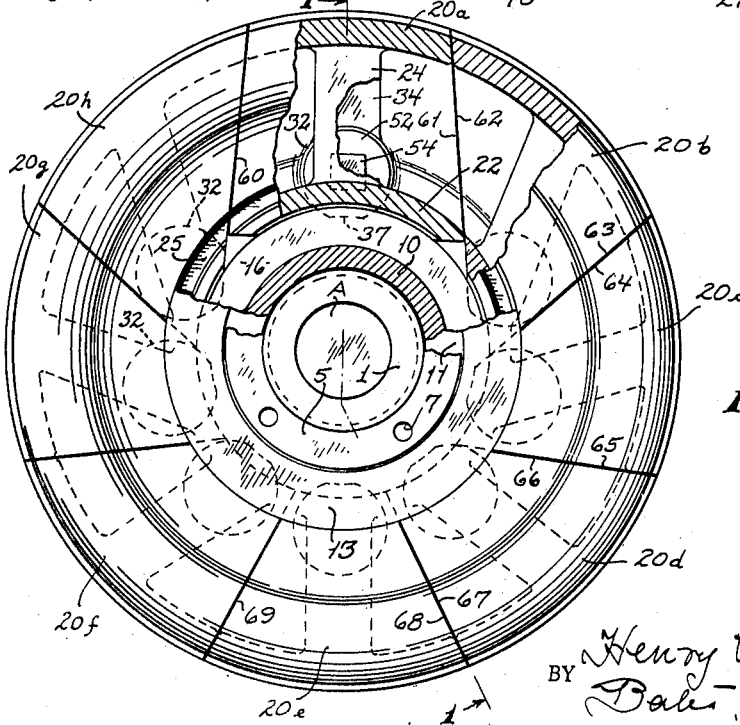
Figure 3:
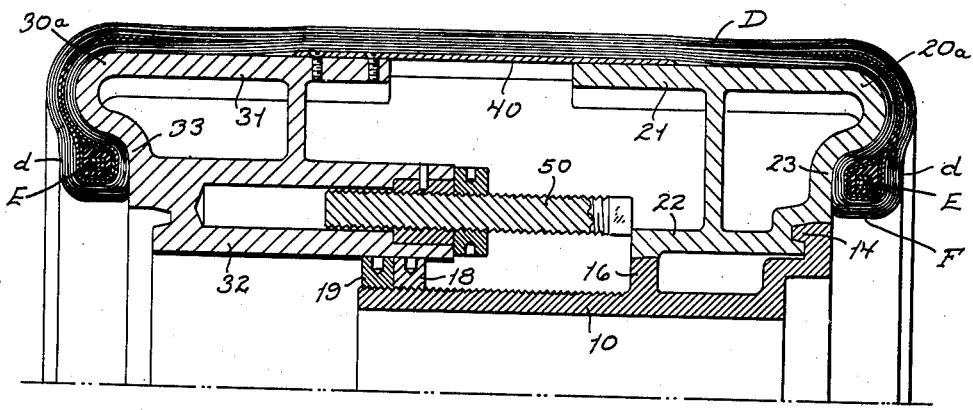
Figure 4:
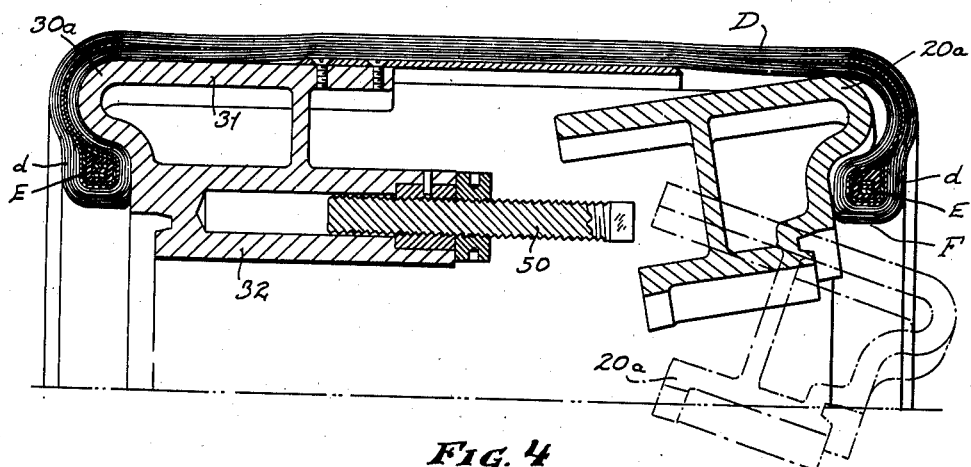
Figures 5, 6:
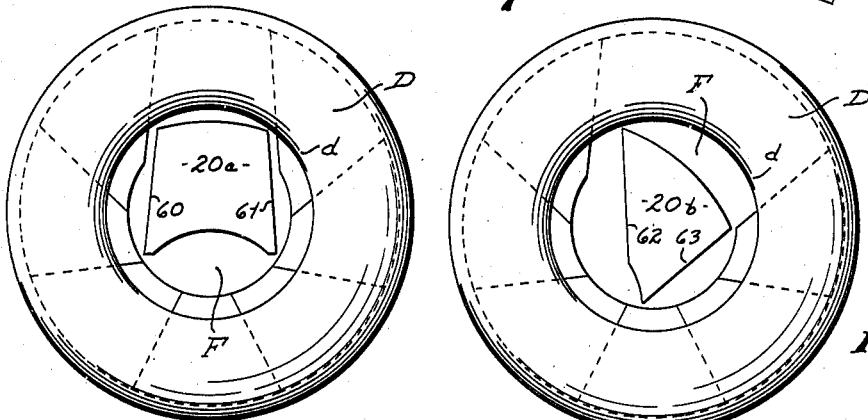
Figure 7:
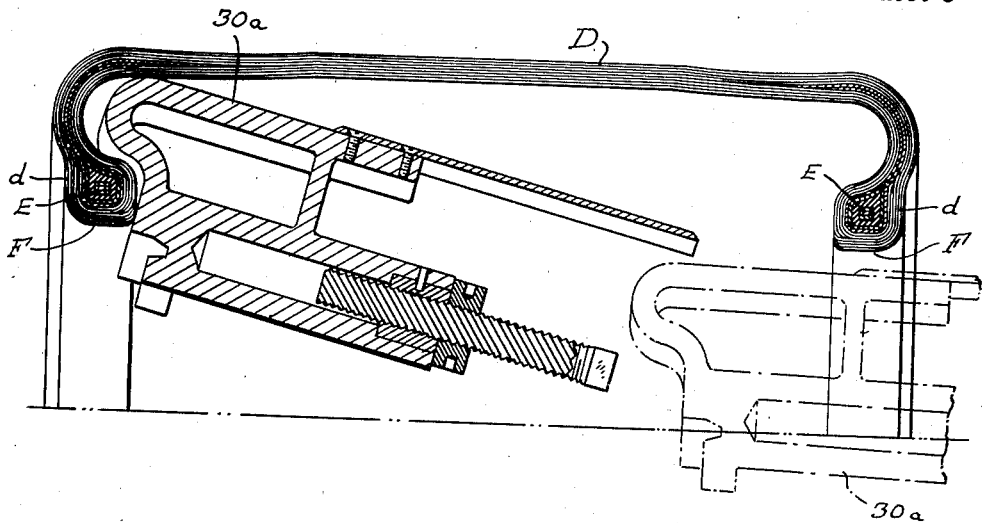
Figure 8:
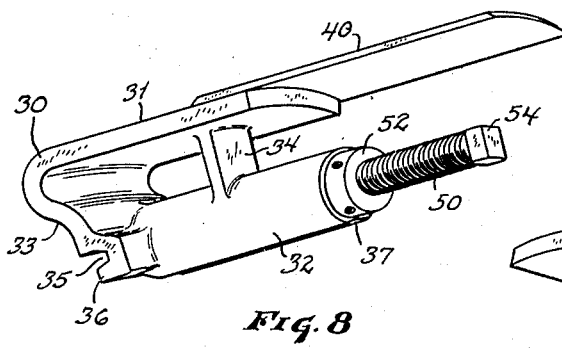
Figure 9:
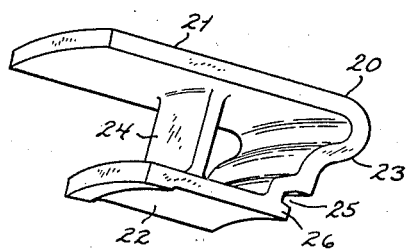
Figure 10:
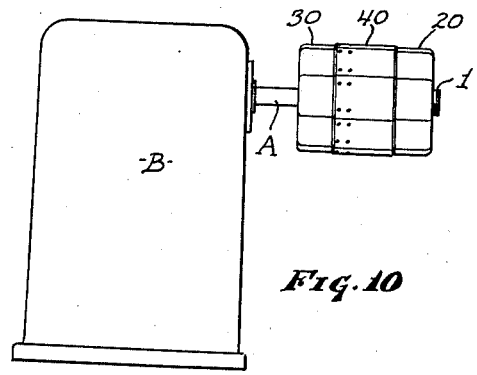

In the drawings, which illustrate an approved embodiment of the invention, Fig. 1 is a longitudinal axial section of the drum on the two planes indicated by the line 1—1 in Fig. 2; Fig. 2 is an end view partially broken away of the drum looking at the right hand end of Fig. 1; Fig. 3 is a longitudinal section corresponding to the upper half of Fig. 1 after removal from the driving tubular spindle, this view showing a tire carcass on the drum, the tread being omitted; Fig. 4 is a view similar to Fig. 3 but showing one of the sections in the act of being removed; Fig. 5 is a diametric end view, on a smaller scale, illustrating the removal of the first peripheral section of the drum; Fig. 6 is a similar view illustrating the removal of the second section of the drum; Fig. 7 is a view similar to Figs. 3 and 4 but illustrating the removal of a section at the other end of the drum; Fig. 8 is a perspective of one of the sections at the left hand end of the drum, shown in the act of removal in Fig. 7; Fig. 9 is a perspective of one of the sections at the right hand end of the drum, shown in the act of removal in Fig. 4; Fig. 10 is an elevation illustrating the drum mounted on the supporting spindle.

My tire building drum, illustrated at 20, 30, 40, in Fig. 10, is removably mounted on a rotating spindle A, supported by a suitable standard B and driven, by mechanism not shown, within such standard. Surrounding the spindle A and rigidly mounted thereon is a sleeve 1 (Figs. 10 and 1) having a groove receiving the key 2 seated in the spindle, the sleeve being clamped to the spindle by a set screw 3. The sleeve has at its outer end a radial flange 8 carrying on its inner face an annular rib 9 for a purpose hereinafter explained.

Embracing the sleeve 1 is a second sleeve 10 adjustable along the sleeve 1 by means of a nut 5 on the latter, which engages the thread 6 on the exterior of sleeve 1, and may have sockets 7 for the application of a spanner wrench. The nut 5 preferably occupies an annular recess 11 in the sleeve 10.

Mounted on the exterior of the sleeve 10 are a set of segments designated generically 20 and individually 20a, 20b, 20c, etc., see Fig. 2. These segments interfit, and together make a complete circumference at one end portion of the drum. At the other end are a set of segments 30 (corresponding in circumferential extent to the segments 20a, 20b, etc.). These segments 30 are carried in part by the sleeve 1 and in part by the sleeve 10. Each of these segments 30 carries an extension 40 lapping over the corresponding segment at the other end. Thus the set of segments of the 20 series and the set of segments of the 30 series with their extensions 40 make a complete drum suitable for the building of a tire.

Each of the segments 20 or 30 is externally rounded where the outer periphery is flanged to form an inwardly set end portion. The outer peripheries furnish a support for the tire body, which bends around the rounded end and carries its bead in the end recess. This is illustrated in Figs. 3, 4 and 7, where D indicates the body of the tire (before the tread portion is applied) and d the bead portion thereof, carrying the annular internal metal bead ring E.

The metal bead rings obviously prevent any stretching of the tire, and with tires, of the type for which this drum is designed, limit the space available for removal of the drum through a comparatively small circular opening, indicated at F in Figs. 5 and 6. My drum has been specifically designed for removal through such opening.

Returning now to a more specific description of the drum parts, it may be seen from Figs. 1, 2 and 3, that the sleeve 10 has at the outer end a radial ring-like portion 13 with an inwardly projecting annular rib 14, leaving an annular groove 15. The sleeve also carries intermediately an annular rib 16. Each of the segments of the 20 series is formed in the general manner indicated in Fig. 9 and has an outer segmental portion 21, inner segmental portion 22, a curved end wall 23 connecting such portions, and an intermediate web 24 also connecting the inner and outer portions. The end wall has in it a recess 25.

Each of the segments 20 is designed to seat on the sleeve 10, the inner end of the inner segmental portion 22 resting on the annular rib 16, and the inner surface of the end wall 23 resting on the outer periphery of the sleeve-end 13, with the groove 25 of the segment receiving the rib 14 of the sleeve end, and the extreme end 26 of the inner portion occupying the groove 15, as shown in Figs. 1 and 3.

The sleeve 10 is externally threaded from its inner end substantially up to the rib 16, as shown at 17 in Fig. 1. On this threaded portion are a pair of cylindrical nuts 18 and 19, each of which act as a lock nut for the other.

The segments of the 30 series rest in part on the cylindrical periphery of the nuts 18 and 19 on the sleeve 10 and in part are carried by the end wall 8 on the sleeve 1. This end wall is formed at its outer periphery to form a seat for the segments, and is provided with the inward rib 9, which occupies a groove in the segments.

The segments of the 30 series are of the general form illustrated in Fig. 8 and comprise the outer segmental portion 31, the inner barrel-like portion 32, the end wall 33, connecting these parts, and the internal web 34 also connecting them. The end wall is formed substantially in a similar manner to that heretofore described with reference to the segments 20, has a curved portion for receiving the part of the tire adjacent the bead and extends inwardly to provide for the bead and then has an annular recess 35 and below that an annular rib 36.

When the segments 30 are in place, the face on the outer side of the groove 35 rests on the outer periphery of the sleeve end 8, the rib 9 of that sleeve end occupying the groove 35. The tubular portion 32 is slightly cut-away on its innermost portion to present a cylindrical arc 37 which snugly engages the outer periphery of the cylindrical nuts 18 and 19.

When the segments of the 30 series are in place on the end 8 of the sleeve 1 and the nuts 18 and 19 on the sleeve 10, as shown in Fig. 1, the outer surface 31 of those segments forms a complete cylinder and aligns with the complete cylinder formed by the outer surfaces 21 of the segments 20.

The space between the two cylindrical surfaces 31 and 21 is bridged by a thin cylindrical member made up of segments 40 carried by the respective segments of the 30 series. As shown each segment 40 extends snugly over the corresponding segment 30 and is secured thereto by countersunk screws 41. The end edges of the segments 40 are beveled as shown in 42, so that for practical purposes there is an externally smooth drum from one end to the other.

I have mentioned that the sleeve 10 is adjustable longitudinally on the sleeve 1 and this provides for drums of different lengths, since the segments 20 may telescope within the segments 40. To maintain the two segments in adjusted position, I provide each of the segments 30 with an adjustable screw 50 which is adapted to abut against the corresponding segment 20.

As shown in Figs. 1 to 4, and 7, the screw 50 is mounted in a nut 51 rigidly pinned within an enlarged recess at the entrance to the bore 38 of the segment barrel 32. A jam nut 52 locks the screw in adjusted position. The end of the screw is formed with an angular head 54 for the application of a wrench and this head abuts against the end of the inner segmental portion 22 of the corresponding segment 20.

When the parts are put into place, as shown in Fig. 1, the nut 5, threaded on the sleeve 1, forces the sleeve 10 and the segments 20 toward the left, so that the segments 20 abut the ends of the screws 50, and this forces the segments 30 tightly against the end 8 of the sleeve 1, so that a solid drum is provided for the building of the tire carcass. This drum has a width previously determined by the setting of the screw 50. While this adjustment is desirable, the drum would be useful, for a given size of tire, if the segments 30 had merely fixed abutments engaged by the segments 20.

The particular mechanism described enables the ready removal of parts of the drum after the formation of the tire, as will be apparent from the following description of the inter-action of the segments of a set.

It will be seen from Figs. 2, 5 and 6, that the various segments of the 20 series do not meet on radial lines, but, on the contrary, on lines differing in direction for substantially each segment. That is to say, the topmost segment 20a has its edges 60 and 61 diverging inwardly and symmetrically, as shown in Figs. 2 and 5. The segment 20b has its edges 62 and 63 converging inwardly non-symmetrically to form quite an acute angle. The edges 64 and 65 of the segment 20c also form an acute angle non-symmetrically, as do also the edges 66 and 67 of the segment 20d. The next segment 20e has edges 68 and 69 converging inwardly symmetrically as shown. The remaining segments 20f, 20g and 20h correspond to the segments 20d, 20c and 20b respectively.

The division of the end of the drum into various shaped segments shown, one diverging inwardly and one converging inwardly symmetrically, the others converging inwardly non-symmetrically, has been found to produce segments which will be as large as practicable and still will be readily removable through the comparatively small circular space available within the tire bead.

In dismantling the drum, after the tire has been formed, the first operation is to remove nut 5 and slide the entire drum off of the fixed supporting sleeve 1, the removed parts being indicated in Fig. 3. The next operation is to slide the sleeve 10 to the right out through the opening within the tire bead. Then the segment 20a is swung, from normal position, inwardly as shown in Fig. 4—at first into the position as shown in full lines and then in that shown in broken lines—after which it is removed through the tire opening.

After the removal of the segment 20a the segment 20b is moved into the tire opening, as indicated in Fig. 6, and then removed. This procedure is continued successively with the segments 20c, 20d and 20e, and so on, until the last segment is removed.

After the segments of the 20 series have been removed, those of the 30 series are removed.

These segments extend at their edges in the same manner as that described for the segments 20, that is to say, the topmost segment 30a, shown in Figs. 1, 3, 4 and 7, has diverging edges like the edges 60 and 61 of the segment 20a. The diametrically opposite segment of the 30 series would have its edges inwardly converging like the edges 68 and 69 of the segment 20e, and the other segments 30 would be non-symmetrically converging like the corresponding segments described in the 20 series.

In removing the segments of the 30 series they are simply tipped inwardly, as shown in Fig. 7, and then are straightened out into registration with the tire bead opening and drawn out, as indicated by the broken lines in Fig. 7.

The removal of the parts, as described, entirely clears the interior of the tire, freeing it without in any manner disturbing the position of the beads as formed on the drum.

In originally assembling the drum, one may proceed as follows: First, the sleeve 1 is mounted on the spindle A and secured by the set screw 3. The various segments of the 30 series are put in place, the last one being the topmost segment 30a shown in Fig. 1, that is the segment having the inwardly flaring edges. In so assembling these segments it is convenient to provide a temporary band around their exterior. The various segments of the 20 series may be mounted on the exterior of the sleeve 10, a temporary band around the exterior of the segments being employed if desired, and then the sleeve 10, with the segments thereon, shoved into place over the sleeve 1 on the spindle until the nuts 18 and 19 on the sleeve 10 slide beneath the segments 30 and the segments 20 abut the screws 50. In this position the extension segments 40 have slid over the segments 20. Then the parts are locked in place by applying the nut 5 and turning it into final position.

It will be seen that the parts may be assembled without difficulty to provide a drum of variable width, previously selected, by positioning the screws 50. When the nut 5 is finally turned into place, the whole drum is rigid and firmly mounted on the spindle A ready for the formation of the tire. After the tire is completed, the removal of the nut 5 allows the successive removal of the various parts of the drum until the tire is entirely free. The drum, accordingly, provides for the manufacture of those types of tires which have comparatively small openings within stiff bead rings.

I claim:

1. A tire making drum comprising a pair of opposed shells, means adjustably mounted on one of the shells and providing an abutment for the other shell, means for forcing the shells axially toward each other into assembled position, at least one of said shells comprising detachable interfitting segments independently removable from the tire by an inward and then longitudinal movement.

2. A tire making drum having a sleeve with an outward flange at one end, a second sleeve mounted on the first sleeve, a shell composed of interfitting segments mounted on said second sleeve, a second shell composed of interfitting segments mounted in part on the outward flange of the first sleeve and in part on the second sleeve, adjustable abutments on the segments of the second shell engaging the segments of the first shell.

3. A tire making drum having a sleeve with an outward flange at one end, a second sleeve mounted on the first sleeve and having an outward flange at the other end, a shell composed of interfitting segments mounted on said second sleeve, a second shell composed of interfitting segments mounted in part on the outward flange of the first sleeve and in part on the second sleeve, adjustable abutments on the segments of the second shell engaging the segments of the first shell, and thin gap-bridging sections mounted on the segments of one of the shells and telescopically engaging the segments of the other shell.

4. A collapsible drum for building tires comprising a sleeve adapted to be mounted on a rotatable spindle and having a radially outward extension adjacent one end, an embracing sleeve mounted on the sleeve first mentioned and having a radially outward extension adjacent the opposite end, and two segmental shells facing each other and positioned by means carried by said sleeves.

5. In a tire building drum, the combination of two segmental shells facing each other, each segment having outer and inner peripheral members, a central support with which the peripheral members coact, screws carried by the inner peripheral members of one shell and abutting the inner peripheral members of the other shell, and interlocking shoulders on the support and shells.

6. In a collapible drum, the combination of an inner sleeve having a radially outward extension adjacent one end, an outer embracing sleeve having a radially outward extension adjacent the other end, two facing shells, each made up of a plurality of segmental members with inner and outer peripheral portions, the sleeves having means engaging the inner peripheral portions to support the shells and having means interlocking with the segments, and longitudinally extendable means on the segments of one of the shells engaging the segments of the other shell to limit their mutual approach.

7. In a collapsible drum, the combination of a pair of sleeves, one embracing the other, said sleeves having respectively outward extensious adjacent their opposite ends, a pair of shells facing each other and each made up of a plurality of segments, the shells surrounding the sleeves, inter-fitting annular ribs and grooves on the extensions and segments to lock them together consequent upon longitudinal movement of the extensions relatively toward each other.

8. In a collapsible drum, the combination of a pair of sleeves, one embracing the other, said sleeves having extensions at their opposite ends, with inwardly facing ribs, a pair of segmental shells each having grooves to receive said ribs, and a set of screws on one of the shells engaging the segments of the other shell to limit their mutual approach and means to maintain the two shells interlocked with the two ribs.

9. In a collapsible drum for building tires, the combination of a rotatable support including a cylindrical externally threaded member, a nut mounted on such threaded member, two facing shells each made up of a plurality of segments surrounding and carried by such support, one of said shells surrounding the bearing on said threaded member, and the other shell surrounding and bearing on said nut and slidable thereover, thin segmental shields carried by the segments of one shell overlapping those of the other shell, and means for adjusting the shells toward and from each other.

10. In a collapsible drum for building tires, the combination of a sleeve adapted to be mounted on a rotating spindle and having a radial extension at one end, a sleeve mounted on the spindle-sleeve and having a radial extension at the opposite end, the body of such embracing sleeve being externally threaded, a nut mounted on the threaded portion, a shell made up of a plurality of segments resting on the embracing sleeve, a second shell made up of a plurality of segments and resting in part on the spindle-sleeve and in part on the nut on the embracing sleeve.

11. A tire making drum comprising a pair of opposed shells composed of interfitting segments, each having an undercut bead-seating flange, a hollow member adapted to receive the shaft of a drum-rotating machine, said member having an outward extension at one end, a sleeve on the hollow member having an outward extension at the other end, said shells surrounding and bearing on the peripheries of said extensions, and ribs on said outward extensions to hold the segments in assembled position, said shells and said sleeve being removable as a unit from said hollow member, and each detachable interfitting segment being removable from the tire through the bead opening in the tire formed on the drum.

12. A tire making drum comprising a pair of shells each having an undercut bead-seating flange integral therewith, a sleeve extending axially of the drum and adapted to receive the shaft of a drum rotating machine, each of said shells comprising a plurality of interfitting segments, each segment being independently removable through the bead opening of a tire formed thereon, means on the sleeve for engaging all of the segments of one shell, and other means adjusably mounted for axial movement on the sleeve for engaging all of the segments of the other shell, and an abutment on each segment of one shell adapted to engage the opposed segment of the other shell whereby the two shells may be held in assembled position.

13. A tire making drum comprising a pair of opposed shells, each having an undercut bead-seating flange integral therewith and each comprising a plurality of detachable interfitting segments removable independently of each other through the bead opening in a tire formed thereon, one of said shells having means adjustably mounted thereon and extending axially thereof, and adapted to abut the other shell to limit the mutual approach of the shell, and other means for forcing the shells together and holding them in assembled positions.

14. A collapsible drum for building tires comprising a sleeve adapted to be mounted on a rotatable spindle, an embracing sleeve mounted on the sleeve first mentioned, two segmental shells facing each other and one mounted entirely on the embracing sleeve and the other partly on the inner sleeve and partly on the embracing sleeve, whereby the entire construction outside of the inner sleeve may be withdrawn as a unit from such inner sleeve with the tire in place on the withdrawn elements.

15. In a collapsible tire building drum, the combination of a tubular member adapted to surround and be carried by the shaft of a tire-building machine, two sectional shells mounted about the tubular member and held in position thereon by a second tubular member embracing the tubular member first-mentioned and longitudinally movable thereon, and a locking member movably mounted on one of the tubular members and coacting with the other member to retain the parts assembled while enabling ready release of the embracing member without requiring movement thereof after which longitudinal movement of the embracing member may free both shells.

16. In a collapsible tire building drum, the combination of a tubular member adapted to surround and be carried by the shaft of a tire-building machine, two sectional shells mounted about the tubular member and having aligned peripheral portions, a hollow member embracing said tubular member and longitudinally movable thereon and coacting with said shells, and a locking member movably mounted within the lateral confines of the drum and coacting with said hollow member to retain the parts assembled while enabling ready release of said hollow member.

17. In a collapsible tire building drum, the combination of a tubular member adapted to surround and be carried by the shaft of a tire-building machine, two sectional shells mounted about the tubular member and having aligned peripheral portions and underhanging flanges to coact with the heads of tires, a member embracing said tubular member and longitudinally movable thereon and coacting with said shells and a locking member movably mounted on said tubular member within the lateral confines of the drum and coacting with the embracing member to retain the parts assembled while enabling ready release of the embracing member.

18. The combination of a sleeve adapted to be mounted on the shaft of a tire building apparatus and provided with a projecting annular portion having an annular rib on its inner face, a set of segmental members forming a sectional shell having an undercut bead-receiving portion and a portion to support an intermediate region of the tire, a member embracing the sleeve and mounted so as to have the capacity of longitudinal movement thereon, a second set of segments forming a second shell having an undercut bead-receiving portion and a portion to support an intermediate region of the tire, said second portion aligning with the corresponding portion of the first-mentioned shell, said embracing member having an annular rib projecting toward the annular rib on the sleeve, means adapted to control the relative longitudinal position of the two shells, both of said sectional shells being held against longitudinal movement relative to the sleeve in one direction by the annular projection on the sleeve and in the other direction by the embracing member.

19. In a collapsible tire building drum, the combination of a sleeve adapted to surround and be rotated by the shaft of tire building apparatus and provided with a projecting annular portion, a set of segmental members forming a sectional shell having an undercut bead-receiving portion and a peripheral portion to support an intermediate region of the tire, means connected with the shell and located inwardly of said peripheral portion for supporting the shell, a hollow member mounted on the sleeve so as to have the capacity of longitudinal movement thereon and engaging the said segmental members, a movable locking member within the lateral confines of the drum, and coacting with the said sleeve and said ring-like member to hold the latter in engagement with the supporting portions of said segmental members when the latter engage the annular projection on the sleeve, a second set of segments forming a second shell having an undercut bead-receiving portion and a portion to support an intermediate region of the tire, said second portion aligning with the corresponding portion of the first-mentioned shell, and screws coacting with the segments of both shells and threaded in the segments of one and having shoulders engaging the segments of the other shell and adapted to control the relative longitudinal position of the two shells, both of said sectional shells being held against longitudinal movement relative to the sleeve in one direction by the annular projection on the sleeve and in the other direction by the hollow member held in position on the sleeve by said locking member.

20. The combination of a sleeve adapted to be mounted on the shaft of a tire building apparatus and provided with a projecting annular portion having an overhanging laterally projecting rib, a set of segmental members comprising a sectional shell having an undercut bead-receiving portion and a portion to support an intermediate region of the tire, there being a portion underhanging said rib, a member embracing the sleeve and mounted so as to have the capacity of longitudinal movement thereon and having means engaging the said carrying portion of said segmental members, a locking member movably mounted on the sleeve and coacting with the said embracing member to hold the same in engagement with the said segmental members when they engage the said rib on the sleeve, a second set of segments forming a second shell having an undercut bead-receiving portion and a portion to support an intermediate region of the tire, said second portion aligning with the corresponding portion of the first mentioned shell, thin peripheral plates carried by one of the sets of segmental members and overlapping the other set, and screws threaded in the segments of one shell and having shoulders engaging the segments of the other shell and adapted to control longitudinal position of the two shells relative to each other, both of said sectional shells being held against longitudinal movement relative to the sleeve in one direction by the annular projection on the sleeve and in the other direction by the embracing member held in position on the sleeve by the lock movably mounted on the sleeve.

21. In a tire building drum, the combination of two segmental shells, a central support therefor, screws mounted on the segments of one shell and abutting the corresponding segments of the other shell to limit the mutual approach of the shells axially, and means carried by the support and engaging said other shell to hold it in said abutting relation.

22. A collapsible drum for building tires comprising a rotatable driving member having an annular portion extending outward radially, a tubular member embracing the driving member and having an annular portion extending outwardly radially, two segmental shells facing each other and composed of inter-fitting segments, each segment of each shell having a portion to receive the tread of a tire being built and an underhanging portion for the bead of the tire, each segment having an inwardly extending portion within the shell adapted to bear against said embracing member, means carried by the annular portions of said members and coacting with the respective segments for holding the two shells in position, and means for locking said embracing member to said driving member.

HENRY C. BOSTWICK.